US012107981B2

(12) United States Patent
Liao

(10) Patent No.: US 12,107,981 B2
(45) Date of Patent: Oct. 1, 2024

(54) BRACKET AND ELECTRONIC DEVICE

(71) Applicant: Qianhai Junda (Shenzhen) Equity Investment Co., Ltd., Shenzhen (CN)

(72) Inventor: Zhuowen Liao, Shenzhen (CN)

(73) Assignee: Qianhai Junda (Shenzhen) Equity Investment Co., Ltd., Shenzhen (CN)

( * ) Notice: Subject to any disclaimer, the term of this patent is extended or adjusted under 35 U.S.C. 154(b) by 335 days.

(21) Appl. No.: 17/724,593

(22) Filed: Apr. 20, 2022

(65) Prior Publication Data

US 2022/0247849 A1 Aug. 4, 2022

Related U.S. Application Data

(63) Continuation of application No. PCT/CN2020/114977, filed on Sep. 14, 2020.

(51) Int. Cl.
| | |
|---|---|
| *H04M 1/04* | (2006.01) |
| *F16M 11/10* | (2006.01) |
| *F16M 11/22* | (2006.01) |

(52) U.S. Cl.
CPC ............. *H04M 1/04* (2013.01); *F16M 11/10* (2013.01); *F16M 11/22* (2013.01)

(58) Field of Classification Search
CPC ......... H04M 1/04; F16M 11/10; F16M 11/22; F16M 2200/08; F16M 11/2021; G06F 1/16
USPC ...................................................... 455/575.1
See application file for complete search history.

(56) References Cited

U.S. PATENT DOCUMENTS 9,470,356 B1 * 10/2016 Zaloom ................. F16M 11/28

FOREIGN PATENT DOCUMENTS

| CN | 203133736 U | 8/2013 |
|---|---|---|
| CN | 203533114 U | 4/2014 |
| CN | 103916500 A | 7/2014 |
| CN | 110200455 A | 9/2019 |
| CN | 210536326 U | 5/2020 |
| KR | 20150134859 A | 12/2015 |
| KR | 20190111222 A | 10/2019 |

OTHER PUBLICATIONS

Internation Search Report of PCT/CN2020/114977, Mailed May 26, 2021.

* cited by examiner

*Primary Examiner* — Eugene Yun

(57) ABSTRACT

A bracket and an electronic device including the same. The bracket includes a supporting structure and a rotation structure. The supporting structure includes a fixed plate and a support seat for supporting the fixed plate, wherein the fixed plate is provided with a fixed surface and a mounting surface; the fixed surface and the mounting surface are respectively located on two side plate surfaces of the fixed plate which are opposite each other. The electronic device is detachably arranged on the fixed surface. The rotation structure includes a first rotating part connected to the mounting surface and a second rotating part connected to the support seat. The mechanical support and the electrical connection of the tablet can be realized by installing the tablet at one time though the bracket, thereby simplifying the operation process.

9 Claims, 1 Drawing Sheet

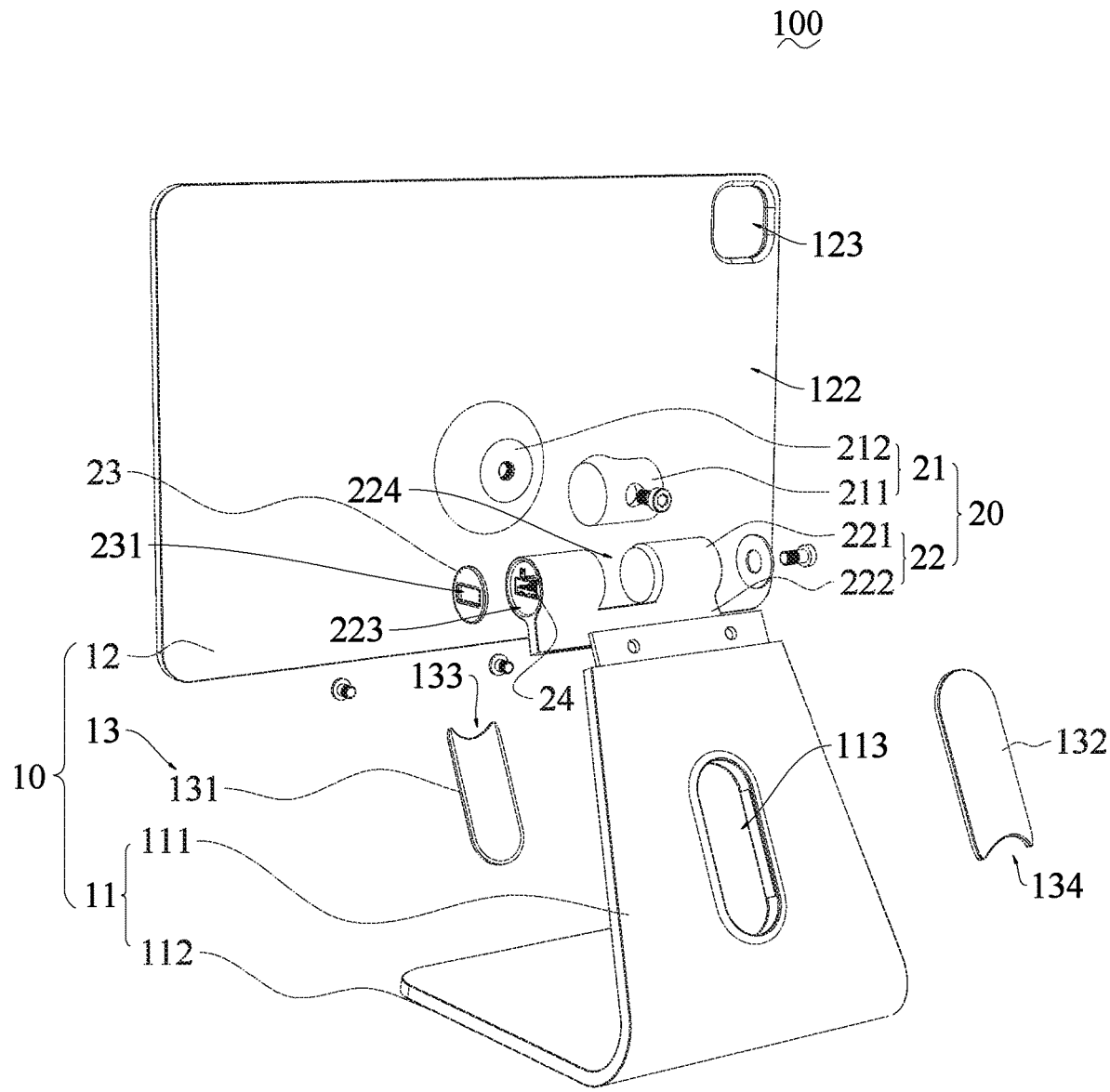

BRACKET AND ELECTRONIC DEVICE

CROSS-REFERENCE TO RELATED APPLICATIONS

This application is a continuation of International Patent Application No. PCT/CN2020/114977 with a filing date of Sep. 14, 2020, designating the United States, now pending. The content of the aforementioned applications, including any intervening amendments thereto, are incorporated herein by reference.

TECHNICAL FIELD

The application relates to the field of electronic technical equipment, in particular to a bracket and an electronic device.

BACKGROUND

With the wide use of smart phones and tablets in electronic devices, the supporting brackets have been widely used.

At present, the common brackets in the market generally only have the support function, that is, they can only realize mechanical support for electronic equipment, so that there is a suitable relative position between electronic equipment and users.

However, when the electronic equipment needs charging or data communication, additional data lines need to be inserted into the electronic equipment, resulting in repeated operation, disordered wiring harness, and single support function.

SUMMARY

Technical Problem

The object of the embodiment of the application is to provide a bracket, which aims to solve the problem of how to diversify the functions of the bracket.

Technical Solution

In order to solve the above technical problems, the technical solution adopted in the embodiment of the application is:

In the first aspect, a bracket for fixing an electronic equipment is provided, wherein the bracket includes:

A support structure, including a fixed plate and a support seat configured for supporting the fixed plate, wherein the fixed plate is provided with a fixed surface and a mounting surface; the fixed surface and the mounting surface are respectively located on two side plate surfaces of the fixed plate which are opposite each other; the electronic equipment is detachably arranged on the fixed surface; and a rotation structure, including a first rotating part connecting the mounting surface and a second rotating part connecting the support seat; wherein the first rotating part is rotatably connected with the second rotating part, and the first rotating part is rotated at a preset angle relative to the second rotating part to regulate an orientation of the fixed surface; the second adapter seat is provided with an electrical connection hole, and the rotation structure further includes an adapter arranged in the electrical connection hole; the adapter is configured for electrical plug-in of an external electronic device to electrically connect the electronic device to the electronic equipment.

In one embodiment, the second rotating part is provided with an avoidance slot communicated with the electrical connection hole; the first rotating part includes a first rotating shaft rotatably arranged on the electrical connection hole and a second rotating shaft with one end connected to the mounting surface and the other end connected to the first rotating shaft at the avoidance slot, and the adapter and the first rotating shaft are arranged at intervals in the electrical connection hole.

In one embodiment, the mounting surface is provided with an adapter hole, the fixed plate is rotatably connected with one end of the second rotating shaft through the adapter hole, and an axial direction of the first rotating shaft is staggered with an axial direction of the second rotating shaft.

In one embodiment, the axial direction of the first rotating shaft is perpendicular to the axial direction of the second rotating shaft.

In one embodiment, the fixed surface is provided with an accommodation cavity, and the accommodation cavity is configured for detachably fixing the electronic equipment.

In one embodiment, a cavity bottom of the accommodation cavity is provided with an avoidance hole penetrating to the mounting surface.

In one embodiment, the second rotating part includes an adapter plate and an adapter column arranged at one end of the adapter plate, the other end of the adapter plate is connected with the support seat, the electrical connection hole is arranged on an end face of the adapter column and through two ends of the adapter column, and the avoidance slot is arranged on a column side surface of the adapter column.

In one embodiment, the second rotating part further includes a sealing cover, the sealing cover covers a hole of the adapter hole and is provided with a plug-in slot, and the electronic device is electrically connected with the adapter through the plug-in slot.

In one embodiment, the support seat includes a support bottom plate and a support side plate arranged obliquely relative to the support bottom plate, one end of the support side plate is connected with the support bottom plate, and the other end of the support side plate is connected with the adapter plate.

In one embodiment, an included angle between the support bottom plate and the support side plate is greater than 0° and less than 90°.

In one embodiment, the support bottom plate is integrally formed with the support side plate.

In one embodiment, the support side plate is provided with wire through hole, and the wire through hole passes through plate surfaces on both sides of the support side plate.

In one embodiment, the support structure further includes a harness box, the harness box is arranged in the wire through hole and is provided with a harness cavity, one end of the harness box is provided with a wire inlet for external wires to pass through the harness cavity, and the other end of the harness box is provided with a wire outlet for the wires to pass through the harness cavity.

In one embodiment, the harness box includes a first half box and a second half box, the second half box abuts with the first half box to form the harness cavity, the wire inlet is opened in the first half box, and the wire outlet is opened in the second half box.

In the second aspect, an electronic device is further provided, including a bracket described above, the electronic device further includes an electronic equipment, and the bracket is configured to support the electronic equipment.

Advantageous Effect

The advantageous effect of the bracket provided by the embodiment of the application is that the tablet is set on the fixed surface, the first rotating part rotates relative to the second rotating part, so as to regulate the relative position between the tablet and the user, and the electrical connection between the power supply or the server and the tablet is realized through the adapter, so as to enrich the function of the bracket. Further, the mechanical support and the electrical connection of the tablet can be realized by installing the tablet at one time, thereby simplifying the operation process.

BRIEF DESCRIPTION OF THE DRAWINGS

In order to more clearly illustrate the technical solution in the embodiment of the application, the following will briefly introduce the drawings needed to be used in the embodiment or exemplary technical description. It is obvious that the drawings in the following description are only some embodiments of the application. For those skilled in the art, other drawings can be obtained according to these drawings without paying creative labor.

FIG. 1 is the exploded view of the bracket provided by the embodiment of the application.

DETAILED DESCRIPTION OF THE EMBODIMENTS

In order to make the object, the technical solution and the advantages of the application more clear, the application is further described in detail below in combination with the attached drawings and embodiments. It should be understood that the specific embodiments described herein are only used to explain the application, which should not regard as a limitation to the application.

It should be noted that when a component is called "fixed" or "provide" on another component, it can be directly or indirectly on another component. When a component is called "connected" to another component, it can be directly or indirectly connected to the other component. The azimuth or positional relationship indicated by the terms "top", "bottom", "left", "right" and so on is based on the azimuth or positional relationship shown in the attached drawings. It is only for convenience of description, rather than indicating or implying that the device or element referred to must have a specific orientation, or be constructed and operated in a specific orientation. Therefore, it cannot be understood as a limitation of the present application. For those skilled person in the art, the specific meaning of the above terms can be understood according to the specific situation. The terms "first" and "second" are only used for descriptive purposes and cannot be understood as indicating or implying relative importance or implicitly indicating the number of technical features. "a plurality of" means two or more, unless otherwise expressly defined.

In order to illustrate the technical solution described in the application, the following will be described in detail in combination with specific drawings and embodiments.

Please refer to FIG. 1, the embodiment of the present application provides a bracket 100 for fixing electronic equipment. Alternatively, the electronic device is a mobile phone or tablet, and in this embodiment, the electronic device is a tablet. The bracket 100 includes a support structure 10 and a rotation structure 20. The support structure 10 includes a fixed plate 12 and a support seat 11 supporting the fixed plate 12. The fixed plate 12 has a fixed surface 124 and a mounting surface 122. The fixed surface 124 and the mounting surface 122 are respectively located on the plate surfaces on both sides of the fixed plate 12 which are arranged opposite to each other Alternatively, during use, the fixed surface 124 is directly set to the user, and the electronic device is detachably set on the fixed surface 124. The rotation structure 20 includes a first rotating part 21 connecting the mounting surface 122 and a second rotating part 22 connecting the support seat 11. The first rotating part 21 is rotatably connected with the second rotating part 22, and the first rotating part 21 rotates a preset angle relative to the second rotating part 22 to regulate the orientation of the fixed surface 124. Alternatively, the plane determined by the rotation direction of the first rotating part 21 is arranged vertically, by the rotation of the first rotating part 21, the included angle between the fixed surface 124 and the horizontal plane is adjusted. So as to adjust the relative position between the tablet and the user, which is convenient for the user to operate the tablet. The second adapter seat is provided with an electrical connection hole 223, and the rotation structure 20 also includes an adapter 24 arranged in the electrical connection hole 223. Alternatively, the adapter 24 is a circuit board. The circuit board is used for electrical plug-in of electronic devices, so that the circuit board can be electrically connected with electronic devices and tablet computers. Alternatively, the electronic devices can be power supply or server. Alternatively, the fixed surface 124 is provided with an electric contact pin, the tablet computer is installed on the fixed surface 124 and electrically connected with the electric contact pin, and then the circuit board is electrically connected with the electric contact pin by arranging wires.

The tablet is set on the fixed surface 124, and the relative position between the tablet and the user is adjusted by rotating the first rotating part 21 relative to the second rotating part 22, so as to realize the electrical connection between the power supply or the server and the tablet through the adapter 24, so as to enrich the use function of the bracket 100, and the mechanical support and the electrical switch of the tablet can be realized by installing the tablet at one time, thereby simplifying the operation process.

Please refer to FIG. 1, in one embodiment, the second rotating part 22 is also provided with an avoidance slot 224 communicated with the electrical connection hole 223. Alternatively, the slot depth direction of the avoidance slot 224 is orthogonal to the hole depth direction of the electrical connection hole 223. The first rotating part 21 includes a first rotating shaft 211 rotatably arranged in the electrical connection hole 223 and a second rotating shaft 212 with one end connected to the mounting surface 122 and the other end connected to the first rotating shaft 211 at the avoidance slot 224. The adapter 24 and the first rotating shaft 211 are arranged at intervals in the electrical connection hole 223. Alternatively, the hole depth direction of the electrical connection hole 223 is set horizontally, and the first rotating shaft 211 rotates a predetermined angle in the adapter hole, so that the second rotating shaft 212 drives the fixed plate 12 to rotate together, so as to adjust the relative position between the tablet computer and the user.

In one embodiment, the mounting surface 122 is provided with an adapter hole, the fixed plate 12 is rotatably connected to one end of the second rotating shaft 212 through the adapter hole, and the axial direction of the first rotating shaft 211 is staggered with the axial direction of the second rotating shaft 212. Alternatively, by rotating the fixed plate 12 at a predetermined angle relative to the second rotating shaft 212, and the tablet computer rotates with the fixed plate 12, so that the tablet computer can be rotated from the vertical state to the horizontal state, or from the horizontal state to the vertical state, which is convenient for the user to operate the tablet computer.

In one embodiment, the axial direction of the first rotating shaft 211 is arranged perpendicular to the axial direction of the second rotating shaft 212. Alternatively, one end of the second rotating shaft 212 is screwed on the shaft side surface of the first rotating shaft 211 to facilitate the installation and disassembly of the first rotating shaft 211 and the second rotating shaft 212.

Referring to FIG. 1, in one embodiment, the fixed surface 124 is provided with a accommodation cavity, and the shape of the accommodation cavity is fitted to the shape of the tablet and is used for detachably fixing the tablet. The electric contact pin is arranged on the cavity wall of the accommodation cavity, so that the tablet computer can be electrically connected with the tablet computer after it is stuck in the accommodation cavity.

In one embodiment, the cavity bottom of the accommodation cavity is provided with an avoidance hole passing through to the mounting surface 122. The camera of the tablet can be photographed through the avoidance hole, so as to avoid the blocking of the fixed plate 12 to the camera of the tablet.

In one embodiment, the second rotating part 22 includes an adapter plate 222 and an adapter column 221 arranged at one end of the adapter plate 222, the other end of the adapter plate 222 is connected with the support seat 11, the electrical connection hole 223 is opened on the adapter column 221 and passes through the end faces at both ends of the adapter column 221, and the avoidance slot 224 is arranged on the column side surface of the adapter column 221.

In one embodiment, the second rotating part 22 also includes a sealing cover 23. The sealing cover 23 covers the hole at one end of the adapter hole, so as to cover the adapter 24 in the electrical connection hole 223. The sealing cover 23 is provided with a plug-in slot 231, and the electronic device is electrically connected to the adapter 24 through the plug-in slot 231.

Referring to FIG. 1, in one embodiment, the support seat 11 includes a support bottom plate 112 and a support side plate 111 arranged obliquely relative to the support bottom plate 112. One end of the support side plate 111 is connected with the support bottom plate 112, and the other end of the support side plate 111 is connected with the adapter plate 222.

In one embodiment, the included angle between the support bottom plate 112 and the support side plate 111 is greater than 0° and less than 90°. In this embodiment, the included angle between the support bottom plate 112 and the support side plate 111 is 75°.

In one embodiment, the support bottom plate 112 is integrally formed with the support side plate 111, thereby facilitating the batch manufacturing of the support bottom plate 112 and the support side plate 111.

Please refer to FIG. 1, in one embodiment, the support side plate 111 is provided with wire through hole 113. The wire through hole 113 passes through the plate surfaces on both sides of the support side plate 111. It can be understood that the wire through hole 113 is convenient for the wire to pass through, so as to make the bracket 100 clean and tidy as a whole and avoid the disorder of the wiring harness.

In one embodiment, the support structure 10 also includes a harness box 13. The harness box 13 is arranged in the wire through hole 113 and has a harness cavity, one end of the harness box 13 is provided with a wire inlet 133 for the wire to pass through the harness cavity, and the other end of the harness box 13 is provided with a wire outlet 134 for the wire to pass through the harness cavity. By providing the harness box 13, the wire exposure can be avoided, which improves the user experience and the beauty of the product.

Please refer to FIG. 1, in one embodiment, the harness box 13 includes a first half box 131 and a second half box 132. The second half box 132 abuts with the first half box 131 to form a harness cavity. The wire inlet 133 is opened in the first half box 131 and the wire outlet 134 is opened in the second half box 132. By setting the harness box 13 into the first half box 131 and the second half box 132, the installation and removal of the harness box 13 are facilitated.

The application also provides an electronic device, which includes a bracket 100. The specific structure of the bracket 100 refers to the above embodiments. Since the electronic device adopts all the technical solutions of all the above embodiments, it also has all the advantageous effects brought by the technical solutions of the above embodiments, and will not be repeated here for brevity.

In one embodiment, the electronic device also includes a tablet, and the bracket 100 is used to support the tablet for the user to operate the tablet.

The above is only the preferred embodiment of the application and is not intended to limit the application. Any modification, equivalent substitution and improvement made within the spirit and principles of the application shall be included in the scope of the application.

What is claimed is:

1. A bracket for fixing an electronic equipment, comprising:
 a support structure, comprising a fixed plate and a support seat configured for supporting the fixed plate, wherein the fixed plate is provided with a fixed surface and a mounting surface; the fixed surface and the mounting surface are respectively located on two side plate surfaces of the fixed plate which are opposite each other; the electronic equipment is detachably arranged on the fixed surface; and
 a rotation structure, comprising a first rotating part connecting the mounting surface and a second rotating part connecting the support seat; wherein the first rotating part is rotatably connected with the second rotating part, and the first rotating part is rotated at a preset angle relative to the second rotating part to regulate an orientation of the fixed surface; a second adapter seat is provided with an electrical connection hole, and the rotation structure further comprises an adapter arranged in the electrical connection hole; the adapter is configured for electrical plug-in of an external electronic device to electrically connect the electronic device to the electronic equipment; and
 wherein the second rotating part is provided with an avoidance slot communicated with the electrical connection hole; the first rotating part comprises a first rotating shaft rotatably arranged on the electrical connection hole and a second rotating shaft with one end connected to the mounting surface and the other end connected to the first rotating shaft at the avoidance slot, and the adapter and the first rotating shaft are arranged at intervals in the electrical connection hole; and wherein the second rotating part comprises an adapter plate and an adapter column arranged at one end of the adapter plate, the other end of the adapter plate is connected with the support seat, the electrical connection hole is arranged on an end face of the adapter column and through two ends of the adapter column, and the avoidance slot is arranged on a column side surface of the adapter column; and wherein the support side plate is provided with wire through hole, and the wire through hole passes through plate surfaces on both sides of the support side plate; and wherein the support structure further comprises a harness box, the harness box is arranged in the wire through hole and is provided with a harness cavity, one end of the harness box is provided with a wire inlet for external wires to pass through the harness cavity, and the other end of the harness box is provided with a wire outlet for the wires to pass through the harness cavity; and wherein the harness box comprises a first half box and a second half box, the second half box abuts with the first half box to form the harness cavity, the wire inlet is opened in the first half box, and the wire outlet is opened in the second half box.

2. The bracket according to claim 1, wherein the mounting surface is provided with an adapter hole, the fixed plate is rotatably connected with one end of the second rotating shaft through the adapter hole, and an axial direction of the first rotating shaft is staggered with an axial direction of the second rotating shaft.

3. The bracket according to claim 2, wherein the axial direction of the first rotating shaft is perpendicular to the axial direction of the second rotating shaft.

4. The bracket according to claim 1, wherein the fixed surface is provided with an accommodation cavity, and the accommodation cavity is configured for detachably fixing the electronic equipment.

5. The bracket according to claim 4, wherein a cavity bottom of the accommodation cavity is provided with an avoidance hole penetrating to the mounting surface.

6. The bracket according to claim 1, wherein the second rotating part further comprises a sealing cover, the sealing cover covers a hole of the adapter hole and is provided with a plug-in slot, and the electronic device is electrically connected with the adapter through the plug-in slot.

7. The bracket according to claim 1, wherein an included angle between the support bottom plate and the support side plate is greater than 0° and less than 90°.

8. The bracket according to claim 1, wherein the support bottom plate is integrally formed with the support side plate.

9. An electronic device, comprising a bracket according to claim 1, the electronic device further comprises an electronic equipment, and the bracket is configured to support the electronic equipment.

* * * * *